Figure 1:
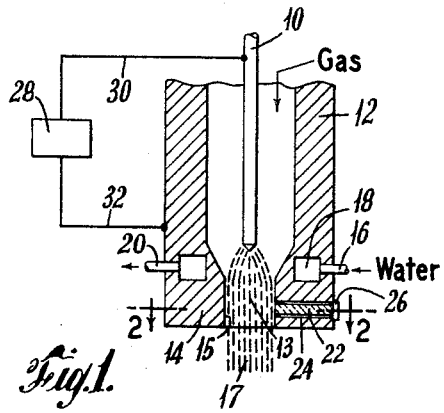

Aug. 30, 1960   J. E. ANDERSON ET AL   2,951,143
ARC TORCH
Filed Sept. 25, 1958

INVENTORS
THOMAS B. REED
JOHN E. ANDERSON
BY William F. Masinger
ATTORNEY

United States Patent Office 2,951,143
Patented Aug. 30, 1960

2,951,143

ARC TORCH

John E. Anderson and Thomas B. Reed, Danville, Ind., assignors to Union Carbide Corporation, a corporation of New York Filed Sept. 25, 1958, Ser. No. 763,419

7 Claims. (Cl. 219—75)

This invention relates to improved apparatus and process for producing and utilizing a wall-stabilized arc-gas stream, and more particularly to an arc erosion-resistant arc torch using refractory, electrically conductive inserts mounted in the wall of a nozzle electrode.

A novel wall-stabilized arc-gas stream is disclosed in the recently issued patent U.S. 2,806,124 to R. M. Gage and in copending U.S. application Serial No. 539,794, filed October 11, 1955 by R. M. Gage, now Patent No. 2,858,411. In the latter, means are provided for maintaining a high pressure arc between an inner stick electrode and a nozzle electrode. A high pressure arc is defined in the references above as a self-sustaining gas discharge in the general pressure range above $\frac{1}{20}$ atmosphere and having a current in the range from a few to thousands of amperes. Means are also provided for passing a gas flow through the nozzle concurrently with the arc wherein the arc-gas stream is collimated and stabilized by the nozzle so that the arc is at least partially wall-stabilized. The effluent from such torch is in the form of a hot gas stream that is controlled and directed by the nozzle. The nozzle passage in the electrode is maintained at a temperature below that of the arc so that the relatively cool nozzle wall in proximity to the arc in combination with the gas flow stabilizes the portion of the arc within the nozzle passage. Usually the nozzle passage in the electrode is externally water-cooled so as to maintain the nozzle electrode below its melting point. When an active gas, and in particular diatomic gas such as hydrogen and nitrogen is used with such apparatus, the nozzle electrode, which is usually the anode, typically and erratically becomes severely eroded and pitted in operation.

The present invention is concerned with an improved arc torch for producing a wall-stabilized arc, the nozzle electrode of which has greatly improved arc erosion-resistant properties. This apparatus employs novel inserts in the nozzle wall fabricated from arc erosion-resistant, high melting point, electrically conductive material. Tungsten is preferably and most conveniently used, but other refractory electrode materials such as tantalum and molybdenum might be employed. The insert is partially thermally insulated or is mounted in poor heat exchange relation to the remainder of the nozzle so that it can operate at temperatures approaching the melting point of such insert. The resulting hot spot acts as a preferential electrode which reduces arc erosion and pitting.

While not intending to be limited thereby, it is believed that the following discussion explains the operation of our invention. In the prior arc torch devices disclosed above, the nozzle electrode was cooled to a degree sufficient to provide a cool gas layer of a sometimes small but always finite thickness surrounding the arc and separating it from the nozzle electrode. Since the arc current consists of electron flow, these electrons must break through such relatively cool gas layer. An electrical current seeks the path of least resistance. Once several electrons had broken through this gas layer at a specific point, other electrons would tend to follow the same path because easily ionized metal vapor is present at this point. Thus, there would be considerable arc current flow concentrated at an almost infinitely small point. This would result in arc pitting of the nozzle electrode surface at that point. Even when the inner nozzle surface is entirely constructed of tungsten and cooled in the usual manner this same result occurs. In the present invention a cooled nozzle body can be used with substantially complete elimination of arc erosion and pitting of the nozzle when tungsten nozzle inserts mounted in poor heat exchange relationship to the remainder of the nozzle are provided. As the apparatus is operated, these inserts become hot since the arc heat and anode heat are not rapidly removed from the inserts. The gas layer surrounding the arc in the nozzle is thus not cooled as severely as it passes over the hot insert. The resulting warmer gas area immediately adjacent to the insert tips is a path of lower resistance to arc electron flow than is the cooler gas next to the cool nozzle walls. The arc flow thus tends to be concentrated at these hot spots. The advantage of the present invention is that the active anode areas on the inserts in the nozzle are considerably larger in cross-section than were the random points in the prior devices where the arc passed through the cool nozzle gas layer. Since the arc current is conducted through a larger cross-section, the current density at the anode surface and power intensity is reduced, thus decreasing the possibility of arc pitting. It can also be seen that since the hot insert surfaces act as preferential electrodes, the actual arc length between the inner stick electrode and the nozzle electrode can be more precisely controlled, if desired, by means of this apparatus. The use of these insert preferential electrodes also tends to improve stability of the arc.

This invention can be practiced by apparatus incorporating a single refractory metal insert. It can also be practiced by including in the apparatus two or more inserts spaced equally around the inner circumference of the nozzle in opposing relationship. It has been found that if the arc is stabilized at a preferential nozzle insert electrode, it has a tendency to also strike at a point on the opposite wall of the nozzle. The ultimate insert form occurs when the entire inner surface of the nozzle is of refractory metal, such as tungsten, keeping in mind that this insert must be mounted in poor heat exchange relationship to the rest of the nozzle electrode so that it can run "hot" during arc operation. In this configuration the "hot" tungsten surface is still considerably below the arc plasma temperature and thus presents a relatively cool surface which tends to stabilize the arc.

This invention using hot refractory nozzle inserts has still another advantage especially when the entire exposed nozzle surface is the refractory insert. This advantage is improved thermal efficiency in utilizing the arc heat to increase the heat content of the effluent gas stream. Since the present invention removes less heat from the nozzle through external water-cooling, for example, it enables a greater amount of arc heat to remain in the effluent stream of arc gas leaving the nozzle, that is, the temperature of the effluent stream is higher when the refractory nozzle inserts are used. This is advantageous when, for example, the hot effluent is to be used to crack hydrocarbons to form acetylene. The beneficial effects of such refractory inserts are especially noticeable at relatively high current levels where large amounts of coolant were required to prevent prior nozzles from melting.

In the drawing, Figures 1–8 represent longitudinal sectional and/or cross-sectional views of several embodiments of the present invention.

Figure 2:
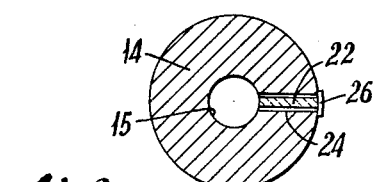

Figure 1 illustrates a torch consisting primarily of an inner electrode 10 and a torch body 12 shaped to form a nozzle 14 with an internal boring passage 15. For maximum arc stability the inner electrode is preferably positioned in axial concentric relation to the nozzle. The nozzle is cooled by introducing cooling fluid, such as water, through conduit 16 into annular space 18 and out through conduit 20. A cross-section view of nozzle 14 along line 2—2 is shown in Fig. 2. Refractory metal insert 22 is positioned loosely within boring 24 in the nozzle 14 so as to result in poor heat exchange between insert 22 and nozzle 14. The clearance between insert 22 and bore 24 is exaggerated for clearness of illustration. The insert could be surrounded with a high temperature heat insulating material as an alternative means of obtaining poor heat exchange. Electrical contact between insert 22 and nozzle 14 is maintained by connector 26 which may conveniently be a soldered or welded joint.

Insert 22 is conveniently in cylindrical or rod form as shown in Figures 1 and 2. However, other shapes might be used if desired. The important features of the insert with respect to physical shape and location are that at least one surface is exposed to the nozzle electrode passage and that at least such surface thereof is partially thermally insulated from the remainder of the nozzle while the insert is still in electrical contact with the nozzle electrode.

This apparatus can be operated to produce a wall-stabilized arc-gas stream by connecting a power source 28 between inner electrode 10 and nozzle electrode 14 by means of leads 30 and 32 respectively. A gas flow is introduced through the annular space between inner electrode 10 and torch body 12 and passes out through nozzle passage 15. This gas flow is preferably axial in relation to the inner electrode and the nozzle. An arc 13 is then established between stick electrode 10 and insert 22. The hot gas effluent 17 is thereby controlled and directed by the wall stabilizing passage.

Figure 3:
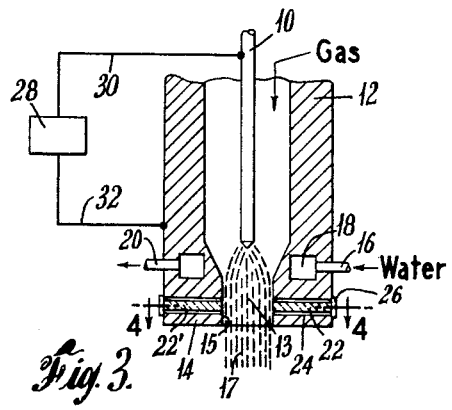
Figure 4:
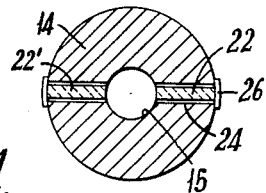
Figure 5:
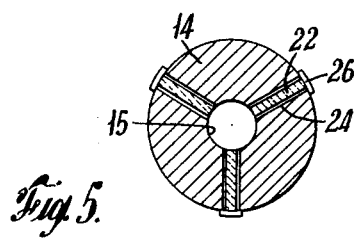

Another form of the invention is shown in Figures 3 and 4. Figure 4 being a sectional view taken along line 4—4 of Figure 3. In this form at least two inserts 22 and 22′ are employed. Additional inserts could be employed as shown in Figure 5.

Figure 6:
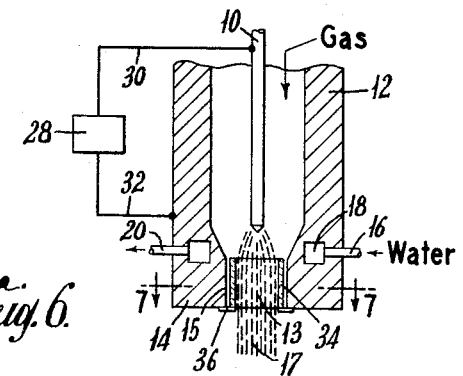
Figure 7:
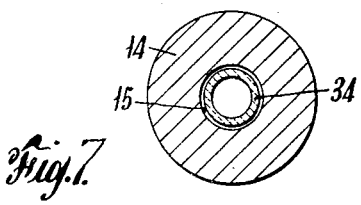

Figures 6 and 7 show an apparatus variation wherein the entire inner nozzle electrode surface is a refractory metal insert. The insert 34 is loosely mounted within the boring 15 with an electrical connection 36 at one end.

Figure 8:
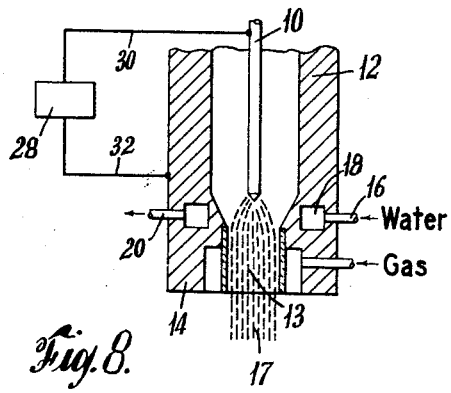

Figure 8 shows an additional modification of the invention wherein a shielding gas stream external to the refractory metal insert protects it from atmospheric oxidation during operation. In this apparatus modification, as the insert approaches its melting point, the external gas at the outer surface of the hot insert will be dissociated thus tending to cool the insert and preventing it from being destroyed. Hydrogen is the preferred gas for this purpose since it has a lower dissociation energy than other non-oxidizing diatomic gases, such as nitrogen.

The apparatus of this invention can be used with any of the torch gases disclosed in U.S. 2,806,124, such as argon, helium, hydrogen, nitrogen or mixtures thereof, but it is especially useful when operated with active diatomic gases, such as hydrogen and nitrogen. The resulting hot gas effluent can be used for promoting chemical reactions, such as the pyrolysis of hydrocarbons to form acetylene. It can also be used to produce an atomic hydrogen-containing stream in commercial quantities for other applications such as cutting and welding of metals.

The following example describes a typical operation of this improved arc torch.

*Example I*

A torch similar to that shown in Figures 3 and 4 was used. The diameter of the stick electrode, the bore diameter of the nozzle electrode and the diameter of the two tungsten cylindrical inserts were all ⅛ in. The torch was operated under arc conditions of 93 volts (DCSP) and 149 amperes while hydrogen gas at 24.9 liters/min. passed down through the nozzle bore. Cooling water also passed through the annular cooling passage in the torch body. The resulting hot gas effluent of atomic hydrogen was subsequently used to crack methane gas to acetylene and by-products. No visible damage resulted to arc nozzle due to erosion or arc pitting.

Similar apparatus was operated continuously with hydrogen gas for as long as 5 hours without any signs of erosion or pitting of the nozzle. Similar equipment using hydrogen gas without the tungsten inserts in the nozzle wall typically failed due to severe erosion and pitting after about one hour of operation.

Direct current straight polarity power (stick electrode is the cathode) is most conveniently used with this equipment. However, other power sources, such as direct current reverse polarity, alternating current and rippling direct current, could also be used since the arc is easily struck between the hot stick electrode and the hot insert electrode.

The following example describes operation of a torch employing a refractory metal insert which covers the entire exposed nozzle anode surface.

*Example II*

A torch similar to that shown in Figures 6 and 7 was used. The diameter of the stick electrode and the bore diameter of the molybdenum metal insert were both ⅛ inch. The torch was operated under arc conditions of 18.3 kw. total power while hydrogen gas at 28 liters/min. passed through the nozzle insert bore. About 11.7 kw. of power was transferred to the hydrogen stream. Cooling water also passed through the annular cooling passage in the torch body. The resulting hot gas effluent of atomic hydrogen was subsequently used to crack methane gas to acetylene and by-products. No visible damage resulted to the molybdenum insert due to erosion or arc pitting.

What is claimed is:

1. A high pressure arc torch comprising an electrically conductive body provided with a nozzle having an internal cooling liquid passage in the interior of the wall thereof, a stick electrode disposed within said body and terminating in spaced relation to the interior of said nozzle, means for supplying gas to the inside of said body for discharge through said nozzle, a refractory metal preferential electrode associated with said nozzle, arc current circuit means including said body and nozzle for energizing a high-pressure arc between the end of said stick electrode and said preferential electrode, said preferential electrode being mounted in said nozzle so that, while arc current is conducted through the nozzle to such preferential electrode, the thermal contact therebetween is relatively poor, causing the preferential electrode to operate at a substantially higher temperature and thus become more attractive as an arc terminal than the nozzle per se.

2. An arc torch in accordance with claim 1 wherein said preferential electrode consists essentially of a refractory metal selected from the group consisting of tungsten, molybdenum and tantalum.

3. A high pressure arc torch comprising an electrically conductive body provided with a nozzle having an internal cooling liquid passage in the interior of the wall thereof, a stick electrode disposed within said body and terminating in spaced relation to the interior of said nozzle, means for supplying gas to the inside of said body for discharge through said nozzle, a refractory metal preferential electrode associated with said nozzle, arc current circuit means including said body and nozzle for energizing a high-pressure arc between the end of said stick electrode and said preferential electrode, said nozzle in combination with said gas discharge acting to stabilize at least a portion of said arc, said preferential electrode being mounted in said nozzle so that, while arc current is conducted through the nozzle to such preferential electrode, the thermal contact therebetween is relatively poor, causing the preferential electrode to operate at a substantially higher temperature and thus become more attractive as an arc terminal than the nozzle per se.

4. A high pressure arc torch comprising an electrically conductive annular body provided with a nozzle having an internal cooling liquid passage in the interior of the wall thereof, a stick electrode disposed within said body and terminating in spaced relation to the interior of said nozzle, means for supplying gas to the inside of said body for discharge through said nozzle, at least two refractory metal preferential electrodes associated with said nozzle, arc current circuit means including said body and nozzle for energizing a high-pressure arc between the end of said stick electrode and said preferential electrodes, said preferential electrodes being opposingly positioned and mounted in said nozzle so that, while arc current is conducted through the nozzle to such preferential electrodes, the thermal contact between said nozzle and said preferential electrodes is relatively poor, causing the preferential electrodes to operate at a substantially higher temperature and thus become more attractive as arc terminals than the nozzle per se.

5. A high pressure arc process comprising feeding a gas through an electrically conductive liquid cooled annular body provided with a nozzle, establishing a high pressure arc between a stick electrode disposed within said body and a refractory metal preferential electrode associated with said nozzle, said preferential electrode being mounted in said nozzle so that, while arc current is conducted through the nozzle to such preferential electrode, the thermal contact therebetween is relatively poor, causing the preferential electrode to operate at a substantially higher temperature and thus become more attractive as an arc terminal than the nozzle per se, and thereby discharging a controlled and directed jet-like effluent of hot gas.

6. Process in accordance with claim 5 wherein said preferential electrode consists essentially of a refractory metal selected from the group consisting of tungsten, molybdenum and tantalum.

7. Process in accordance with claim 5 wherein said gas is selected from the group consisting of hydrogen and nitrogen.

References Cited in the file of this patent

UNITED STATES PATENTS 2,858,412   Kane et al. _____ Oct. 28, 1958